May 12, 1970
J. F. FLORI
3,511,627
METHOD AND APPARATUS FOR THE PRODUCTION OF FLAT GLASS
WITH EDGE TEMPERATURE SENSING MEANS
Original Filed March 9, 1965
2 Sheets-Sheet 1
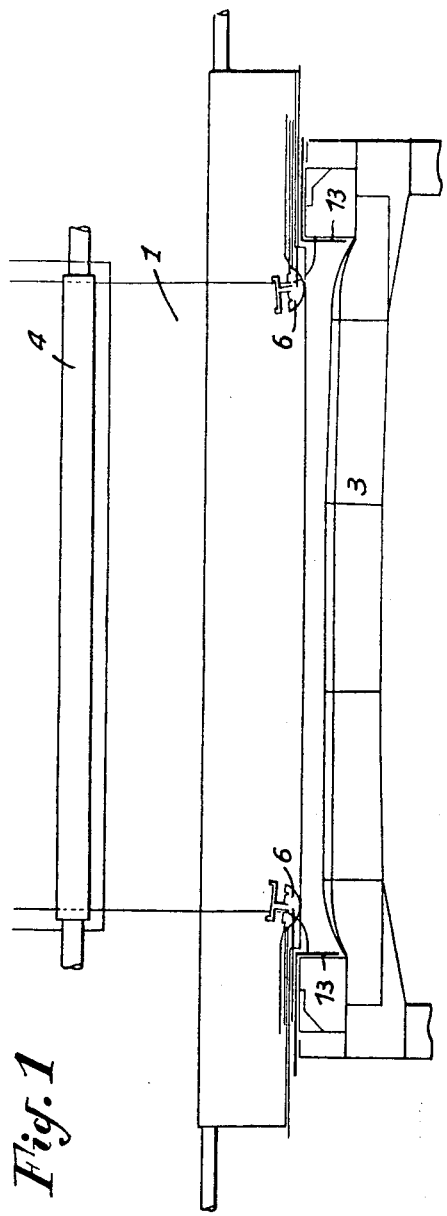
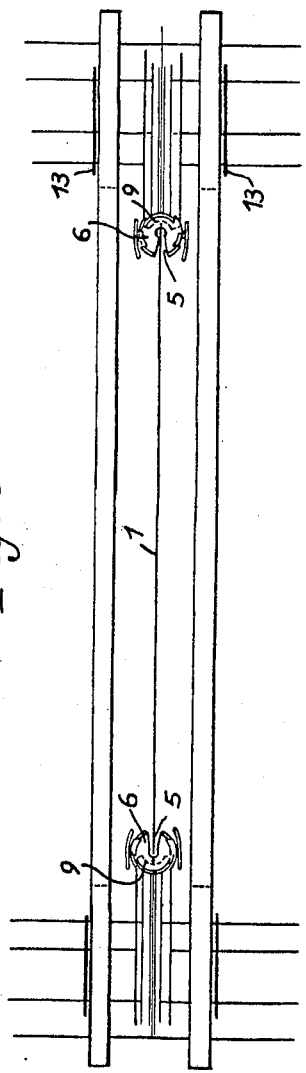
Inventor
Jean Francois Flori
By Bauer and Seymour
Attorneys

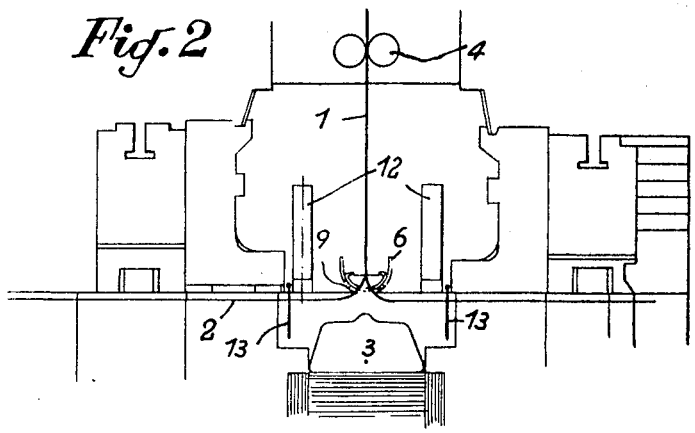
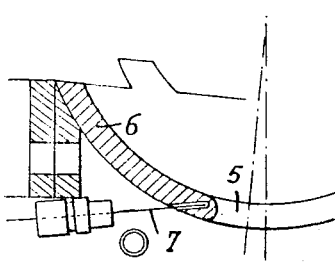
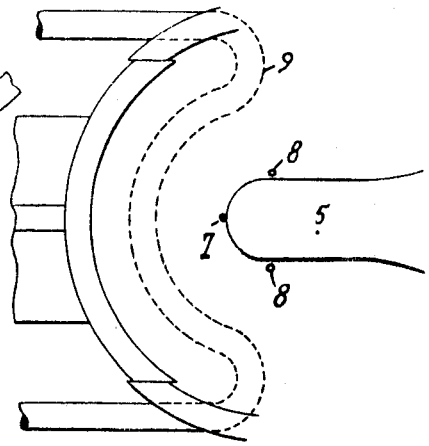
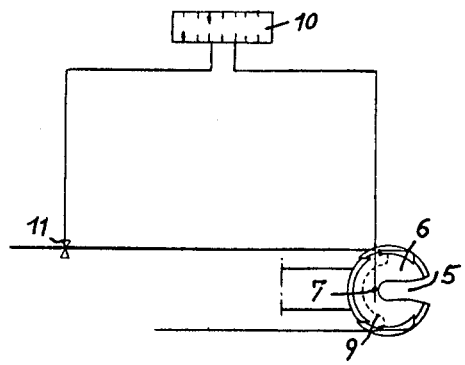

United States Patent Office 3,511,627
Patented May 12, 1970

3,511,627
METHOD AND APPARATUS FOR THE PRODUCTION OF FLAT GLASS WITH EDGE TEMPERATURE SENSING MEANS
Jean Francois Flori, Chalon-sur-Saone, France, assignor to Compagnie de Saint-Gobain, Neuilly-sur-Seine, France
Continuation of application Ser. No. 438,324, Mar. 9, 1965. This application Mar. 13, 1968, Ser. No. 712,868
Claims priority, application France, Mar. 17, 1964, 967,687
Int. Cl. C03b 9/00
U.S. Cl. 65—85                                16 Claims

ABSTRACT OF THE DISCLOSURE

Method and apparatus for production of sheet glass by drawing, wherein the width of the sheet is maintained by edge holders. Each holder is equipped with a thermocouple and means for controlling the temperature of the respective edges of the sheet instantaneously traversing the holder, by circulation therethrough or thereadjacent, of a heat exchange fluid. The thermocouple is included in control circuitry for a valve controlling the rate of circulation of fluid. The circuitry may be set for a desired temperature as sensed by the thermocouple and which will be the optimum temperature for the edges of the glass as they pass through the holders. Heater means may be immersed in, or operate upon the body of molten glass, at the locations where the edges of the incipient sheet emerge, to maintain the glass at these edges somewhat higher than the optimum temperature aforesaid. This assures precise and accurate control and also prevents the accumulation of encrustations adjacent the holders. Means are provided whereby the optimum temperature may be varied in accordance with the rate of draw.

---

This application is a continuation of application Ser. No. 438,324 filed Mar. 9, 1965, now abandoned.

This invention relates to a method and apparatus for the production of flat glass by the continuous vertical drawing of a sheet from the surface of a bath of molten glass; and relates more particularly to the maintenance of constant width of the sheet during drawing.

At the location where the base of the incipient sheet is formed as it emerges from the melt, the glass does not have viscosity sufficient to spontaneously maintain its shape and, as a result the width of the sheet tends continuously to contract or diminish during drawing from the bath. Thus it is necessary to provide means which essentially maintain the edges of the sheet fixed, in predetermined spaced relation as the sheet emerges from the bath. For this reason it is customary under present practice to use an edge retainer at each border of the sheet, and having a slot in and through which the respective side edges of the sheet pass as they are formed in emergence from the bath. Such devices conventionally take the form of a pair of concave receptacles each shaped to receive and hold against lateral movement a respective edge of the emerging sheet.

Since these devices are relatively fixed at a selected distance apart they act to maintain constant the width of the sheet being drawn.

The edges of the sheet being drawn continuously tend to escape from the slots of the retainers; and it requires much care and attention on the part of operating personnel to prevent this. The sheet is particularly likely to escape from the retainers or formers when there is an appreciable change in the rate of drawing. When this happens the width of the sheet progressively decreases with the result that drawing is necessarily interrupted until a bait can be attached and lowered and the drawing of a new sheet begun. In other situations, a mass of glass will vitrify or accumulate at the surface of the bath adjacent the edges of the emerging sheet and render it difficult or even impossible to continue the draw.

I have discovered that once proper flow is established, the width of the sheet being drawn can be kept constant or, what is the same thing, its escape from the retainers can be prevented, by maintaining at a predetermined temperature the edges of the incipient sheet at the level of the retainers. Under such conditions the edges remain fully in the slots of the retainers and show no tendency to withdraw therefrom. Moreover, if for any reason, such as when the rate of drawing is changed, the edges of the sheet are about to withdraw or escape from the retainers, I have discovered that such tendency may be obviated by changing the temperature of the edges of the sheet in correspondence with the change in the rate of drawing, and that by such change in temperature the edges of the sheet are caused to return precisely to their proper positions with each edge fully occupying the slot of its retainer.

The present invention therefore has for its chief object the provision of a method and apparatus which assure that the edges of the sheet being drawn will positively be retained or remain completely each within its slot, without attention from operating personnel. Thereby longer periods of continuous drawing of glass, without shut-down, are made possible.

The present invention is carried into practice by controlling the heat exchange in the deepest part of the slots of the retainers in such a way that the temperature of the glass at the edges of the sheet at the level of the slot are maintained practically constant. The temperature is so selected that the edges of the incipient sheet remain fully in the deepest part of the slots. In accordance with the invention the aforesaid temperature control is attained in a precise way by supplying an excess of heat to the edges of the sheet between the location where the sheet leaves the bath and the place where the edges begin to enter to the interior of the retainers, or, alternatively, to supply coolant in the same zone, as conditions require. In the latter case it is advantageous as will subsequently appear, to first reheat the glass in the bath in zones encompassing the location where the edges of the sheet emerge.

A further object is to provide an apparatus by which the method may be carried into practice, consisting essentially of a device responsive to the temperature of the edges of the sheet adjacent the slots of the retainers.

Another object is to provide an apparatus by which a thermostat responsive to the temperature of the glass at the edges of the the sheet in the zone of heating or cooling, automatically initiates when necessary, as by means of a regulator, the operation of the heating means or the cooling means.

Other objects and advantages of the invention will become obvious to those skilled in the art, after a study of the following detailed description, in connection with the accompanying drawing.

In the drawing:

FIG. 1 is a schematic view in end elevation, of a mechanism embodying the invention;

FIG. 2 is a side elevation corresponding to FIG. 1;

FIG. 3 is a top plan view corresponding to FIGS. 1 and 2;

FIG. 4 is a view partly in section, to an enlarged scale, of a portion of one of the edge retainers, and showing the arrangement therein of a control thermocouple;

FIG. 5 is a top plan view to about the same scale as FIG. 4, and showing particularly the edge former or retainer with cooling coil; and FIG. 6 is a schematic view showing the connections between the temperature sensitive means in the retainer, and the cooling means.

FIGS. 1 to 3 show a glass drawing apparatus embodying the invention. The sheet 1 is being drawn upwardly from the surface of the molten glass in the melting furnace, perpendicularly to the usual drawing bar 3, and immediately passes to and between a pair of rollers 4. The surface of the bath is indicated at 2 and from FIGS. 1 and 2 it is noted that the retainers 6 are located just above surface 2 so that the edges of the sheet are formed by and retained within openings or slots 5 of the retainers. In conformance with the invention each of these retainers is equipped with a thermocouple 7, FIG. 4.

Applicant has discovered that particularly favorable results are attained by sensing or measuring the temperature of the edges of the incipient sheet at the base of the opening or slot of each retainer. More specifically the temperature is measured at the central portion of the slots within the metal by which they are formed, so that the sensitive element of the temperature responsive device is closely adjacent the edge of the incipient sheet and separated therefrom only by a thin partition of metal of about 1 to 2 mm. in thickness. While it is possible to dispose the temperature sensitive element or thermocouple in an upwardly-extending portion of the retainer it is advantageous to locate the element at the side of the slot within the zone of contact of the glass as indicated by points 8, FIG. 5. Said thermocouples indicate the temperature of the edges of the sheet even if the sheet tends to leave the retainer.

The location of the temperature sensitive element within an opening or cavity in the metal of the retainer enables the element to respond with great accuracy, to variations of temperature of the edges of the sheet at the level of its formation without, however, being affected by momentary or temporary changes of ambient temperature which have no effect upon the functioning of the retainers, such as those caused by convection cooling due to flow of gases from the drawing pit.

In a first embodiment and procedure for carrying out the invention, the temperature at the edges of the incipient sheet is governed by the controlled heating of the bath of glass adjacent and below the retainers. This heating may be effected by flame or by radiant heat.

According to a second procedure of carrying out the invention as shown in the drawing, the temperature of the edges of the incipient sheet at the level of the retainers is controlled by means of coolant circulated through conduits 9 located below the retainers between them and the surface of the bath of molten glass. This cooling is effected by means of a fluid coolant such as a current of air, the flow of which is controlled to be constant or intermittent in such a way as to maintain substantially constant the temperature of the edges of the sheet at the level of the retainers. The cooling air is preferably exhausted to an enclosure to avoid perturbations of ambient atmosphere.

In the construction depicted at FIG. 6 the indications or temperature response of thermocouple 7 are transmitted to a control or follow-up regulator 10 or any other apparatus cutting or restoring an electric current as the temperature response by the thermocouple is greater or lower than a predetermined temerature. When the temperature to which thermocouple 7 responds exceeds a predetermined set value, the follow-up control under command of the regulator 10 feeds the coil of an electro-valve 11 which promotes the opening or the non-opening enabling or hindering the passage of the cooling air in the conduits 9.

According to another mode of carrying the invention into practice the temperature of the glass at the base of the incipient sheet is raised in order to control more effectively the temperature at the edges by means of the cooling devices. The action of the cooling means is, of course, more positive, effective and precise when operating to lower the temperature under all conditions encountered in practice. This result is attained by locating heaters in the glass bath below and adjacent the retainers and/or over the extremities of the coolers 12 of the drawing mechanism, and which heat the glass so that it is always somewhat above the proper temperature at which the edges of the sheet will be retained each within a slot. Such heating may be effected by means of electrodes 13 immersed in the glass, two being shown for each retainer. The amount of heat thus transmitted to the glass is such that in the absence of functioning of the cooling means, the edges of the sheet will quickly escape or withdraw from the deepest part of the slots 5.

The reheating of the glass at the foot of the incipient sheet is particularly advantageous because of the tendency of the glass otherwise to devitrify at the sides of the bath where the drawing occurs. When a certain quantity of devitrified glass has thus accumulated in these zones, portions thereof are entrained along and by the edges of the sheet and gather within the slots of the retainers. As a result the drawing of the sheet is adversely affected and if the situation is permitted to continue the machine must be shut down to remove the mass of vitrified glass, with consequent losses due to down time. The addition in the end zones of the bath, of supplemental heating means as just described, reduces or entirely eliminates the aforesaid accumulations of devitrified glass within the involved zones, with the result that times or continuous production without shut-down are greatly increased.

The combination of the two procedures described in the preceding paragraphs is, of course, entirely practicable. In such case the means for measuring the temperature of the sheet of glass at its edges will initiate increase in the quantity of heat supplied to the bath in stages when the temperature of these edges at the level of the retainers is too low, and will initiate operation of the cooling means when the corresponding temperature becomes too high.

It is also possible to employ means measuring the temperature of the glass at the end zones of the incipient sheet and to use such means for maintaining the glass in these zones particularly over the lines of contact of the surface of the glass with the refractory walls, at a temperature elevated above that at which the glass devitrifies over and along the parts at the ends of the drawing zone.

EXAMPLE

From a bath of molten glass, the composition of which is:

| | |
|---|---|
| $SiO_2$ | 72.5 |
| $Al_2O_3$ | 1.2 |
| CaO | 8 |
| MgO | 3.8 |
| $Na_2O$ | 14 |
| Miscellaneous | 0.5 |
| | 100.0 | a 3.5 mm. thick sheet of glass is continuously drawn without any tendency to withdraw out of the slots 5 and without formation of vitrified glass, as the temperature measured as indicated by thermocouple 7 is 730° C. ±3.

What is claimed is:

1. The method of manufacturing flat glass by the vertical drawing of a continuous sheet of glass from the surface of a bath of molten glass, each of the edges of the sheet being guided in a slot formed in a respective one of two edge-retaining members wherein the sheet edges in the vicinity of the retaining members are maintained at a substantially constant predetermined temperature at which the edges of the sheet remain securely in the slots comprising sensing the temperature of the edges of the sheet traversing the slots, and automatically controlling the heat exchange of the glass sheet below the edge-retaining members by applying to the sheet edges below the edge-retaining members, either a heating action by and in response to drop of said sensed temperature below said predetermined temperature or a cooling action by and in response to rise of said sensed temperature above said predetermined temperature.

2. The method of claim 1, the glass at the bottom of the sheet and adjacent thereto being raised to a temperature higher than that at which the edges of the sheet would remain in the slots of the retaining members the glass in that part of the sheet immediately below the retaining members being cooled until it has been reduced to the temperature at which the edges of the sheet remain in the slots of the retaining members.

3. The method of claim 1 wherein the glass in the bath of glass immediately below and beyond each edge of the incipient sheet of glass is heated until its temperature is above the devitrification temperature of the glass.

4. Apparatus for carrying out the method claimed in claim 1 comprising means for vertically drawing a continuous sheet of glass from the surface of a bath of molten glass and, at each edge of the sheet an edge-retaining member formed with a slot for guiding the respective edges, means for sensing the sheet-edge temperature of the glass in the vicinity of the edge-retaining members, means below each said retaining member for heating and/or cooling this edge, and means whereby the heating or cooling means are brought into action in accordance with the temperature sensed by the temperature sensing means, for maintaining the edges at a substantially constant predetermined temperature at which the edges remain in the slots.

5. Apparatus for carrying out the method according to claim 1, comprising means for vertically drawing a continuous sheet of glass from the surface of a bath of molten glass, an edge-retaining member located at each edge of the sheet and formed with a slot for guiding the edge; heaters located within the molten glass at both ends of the bath; a cooling coil located below each retaining member; a thermo-electric couple embedded in metal composing each retaining member, with the sensitive end of the couple 1 to 2 mm. from the edge of the sheet; a feed pipe supplying coolant to the cooling coil; an electrically-operated valve in said feed pipe; and a galvanometric on-off regulator which causes said valve to open when the temperature sensed by the thermo-electric couple exceeds a predetermined value.

6. Apparatus according to claim 4 wherein the temperature sensing means consists of a thermo-electric couple.

7. Apparatus according to claim 6 wherein the thermo-electric couple is embedded in the metal composing the retaining member.

8. Apparatus according to claim 7 wherein the sensitive end of the couple is about 1 mm. from the edge of the sheet.

9. Apparatus according to claim 4 wherein the temperature sensing means is immersed in the side zone of the bath of glass.

10. Apparatus according to claim 4 wherein said cooling means consists of a tube through which flows a coolant.

11. Apparatus according to claim 4, said heating means consisting of electrodes immersed in the bath of glass at each side of the bottom of the sheet, through which electrodes an electric current is passed.

12. Apparatus according to clam 4 wherein the heaters and/or coolers are controlled by a regulator operatively connected to the temperature sensing means.

13. Apparatus according to claim 12 wherein the regulator is connected to an electrically operated control valve and operates on the on-off principle.

14. In a sheet glass drawing apparatus an edge retainer comprising a metallic body having a slot through which the edge of the incipient sheet is drawn and by which it is retained in position in said slot, there being a recess in the metal of the retainer and terminating closely adjacent said slot, and a temperature sensing element positioned in said recess.

15. The apparatus of claim 14, said retainer incorporating a closed passageway extending adjacent said slot, means for circulating coolant fluid to and from said passageway, and means operated by and in response to temperature changes sensed by said temperature sensing element for controlling the flow of coolant to and through said passageway.

16. The device of claim 15, said temperature sensing element being a thermocouple, said temperature responsive means comprising a meter-type contact closer, follow-up means, a valve controlling flow of coolant to and through said passageway and connected with said follow-up means, and circuit connections between said thermocouple, said contact closer and said follow-up means.

References Cited

UNITED STATES PATENTS

| | | | |
|---|---|---|---|
| 1,596,654 | 8/1926 | Gregorius | 65—199 |
| 1,681,258 | 8/1928 | Rowley | 65—199 XR |
| 1,692,585 | 11/1928 | Spinasse | 65—90 XR |
| 1,761,219 | 6/1930 | Mambourg | 65—201 XR |
| 1,790,774 | 2/1931 | Spinasse | 65—91 |
| 1,844,049 | 2/1932 | Spinasse | 65—199 |
| 1,883,734 | 10/1932 | Halbach | 65—199 XR |
| 3,183,294 | 5/1965 | Kasper | 65—162 |
| 3,269,816 | 8/1966 | Helbing | 65—162 |

FRANK W. MIGA, Primary Examiner

U.S. Cl. X.R.

65—91, 160, 162, 199, 204